May 16, 1939. C. H. KUHLMAN 2,158,628
TEMPERATURE REGULATION
Filed May 3, 1937 5 Sheets-Sheet 5

Patented May 16, 1939

2,158,628

UNITED STATES PATENT OFFICE 2,158,628

TEMPERATURE REGULATION

Carl H. Kuhlman, Toledo, Ohio, assignor to The American Temperature Indicating Company, Toledo, Ohio, a corporation of Ohio Application May 3, 1937, Serial No. 140,471

16 Claims. (Cl. 236—1)

This invention relates to indicating and controlling equipment.

This invention has utility when incorporated in temperature regulating, more particularly for a plurality of remote places.

Referring to the drawings:

Fig. 9 is a section on the line IX—IX, Fig. 7;

Figures 1, 2, 3:
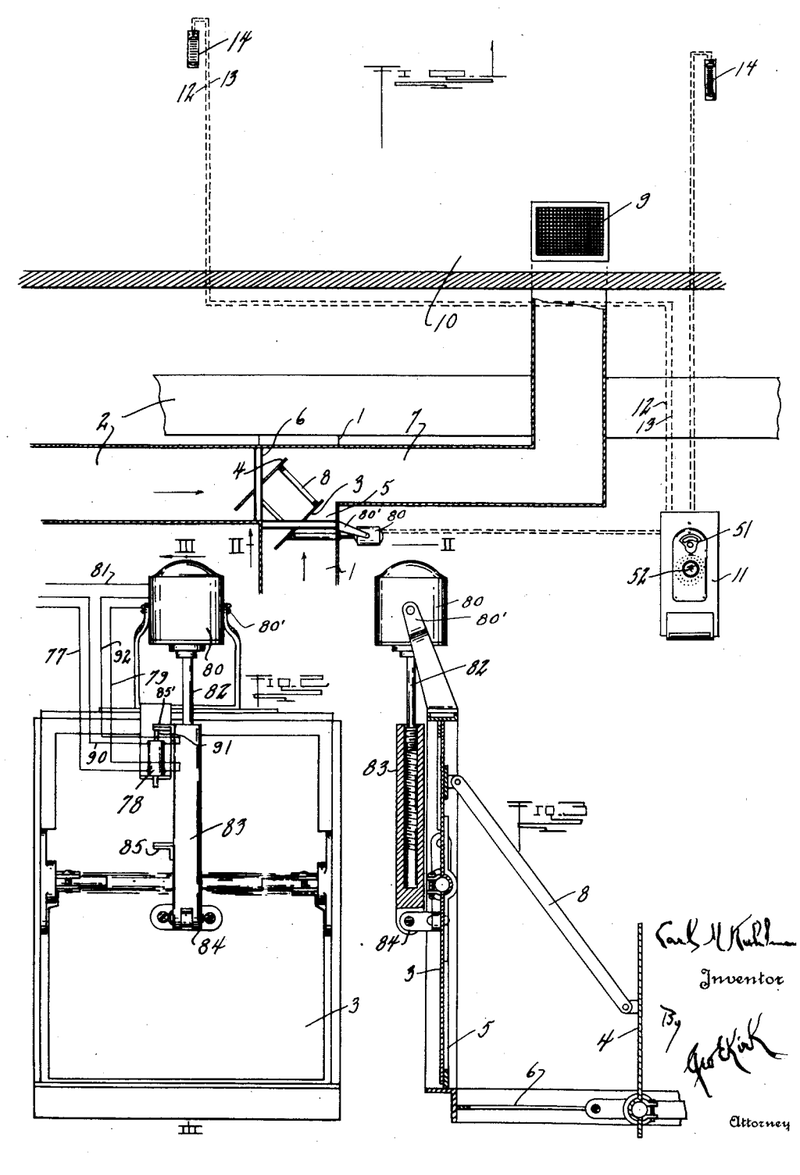
Fig. 1 is a fragmentary view showing an embodiment of the invention.
Fig. 2 is a detail view of the controller affecting temperature, which is on the line II—II, Fig. 1, looking in the direction of the arrow.
Fig. 3 is a section on the line III—III, Fig. 2.

Duct 1 (Fig. 1) for cold air, and duct 2 for warm air, are shown as having dampers 3, 4, as valves at openings 5, 6, to common duct 7. These valves 3, 4, are connected by link 8 so that as the warm air valve 4 is open the cold air valve 3 is closed, thereby determining the character of the ventilating and temperature controlled air as supplied by duct 7 through register 9 into room 10 as a location to be warmed. In practice hereunder, this installation is adopted for a plurality of remote places 10. There may be separate ducts with separate valves and registers making each a complete element in the installation for the delivery of heat from the source of supply to the place to be used.

Central station 11 as a telethermometer is provided with lines 12, 13, to housing 14, wherein is located switch 15 (Figs. 5, 6) mounted on insulating block 16. For line test the switch 15 may be closed. This permits ready testing of the lines to the several housings 14 to check up the relative resistance differences therebetween. When this switch 15 is open, thermo-responsive resistance 17 is left as the connection between the lines 12, 13, at the housing 14. In this central station 11 is non-metallic housed galvanometer 18 (Fig. 14) disposed in a Wheatstone bridge wiring 19 with electric energy supply 20. These electrical devices at the station 11 and therefrom to housings or remote stations 14 constitute a telethermometer. Adjustment of armature 21 by handle 22 at the central station serves to control the magnetic flux of the galvanometer permanent field 21' for bringing indicator needle 23 of the galvanometer 18 into the desired cooperative relation with scale 24.

Figures 14, 15:
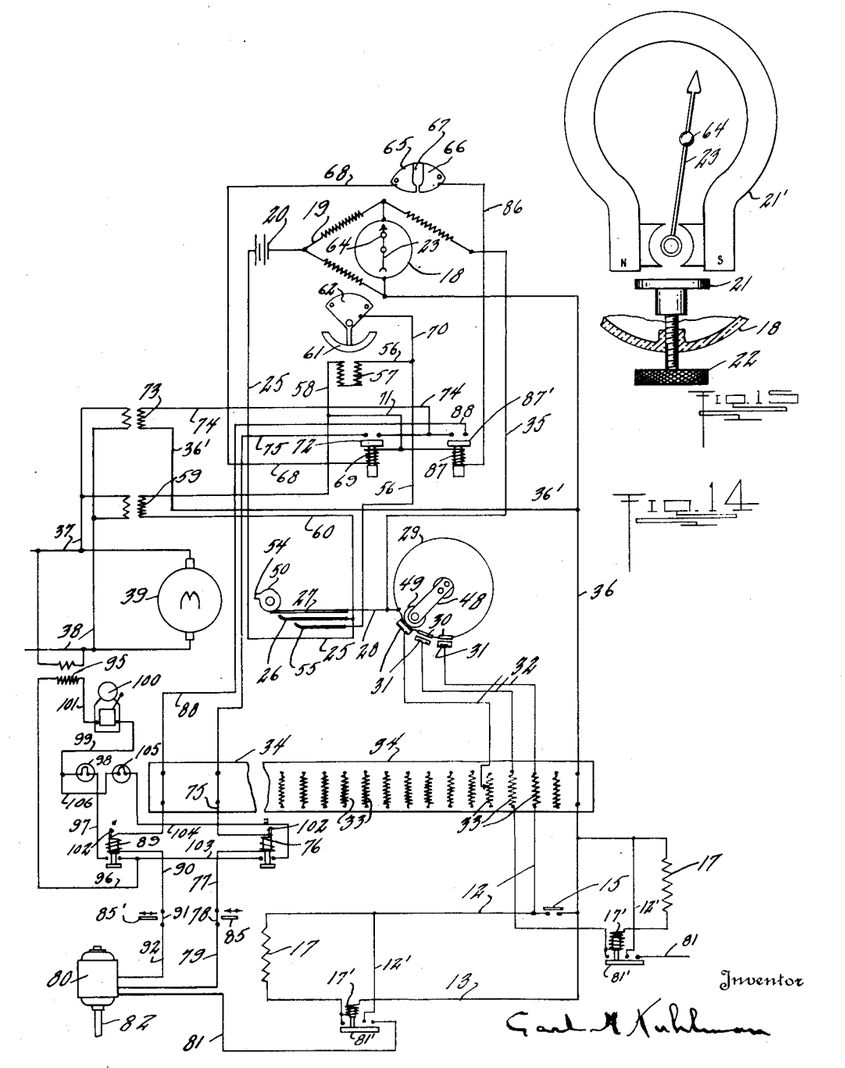
Fig. 14 is a wiring diagram of the installation.
Fig. 15 is a detail view of the galvanometer needle adjustment.

From the battery 20 extends line 25 to switch terminal 26 normally open adjacent switch terminal 27 from which extends line 28 to bus bar 29 having leaves 30 to be thrown, flexed or rocked into contact with opposing terminals 31 connected by line 32 through resistance 33 at panel 34 with the line 12.

The Wheatstone bridge 19 is connected to the line 28 by line 35. The line 13 is connected through the panel 34 with line 36 to the Wheatstone bridge 19. The separate remote stations 10 have their different remote telethermometer stations with housings 14, similarly assembled to such central station 11 herein shown as interconnected with the heating medium supply for temperature control.

In the carrying out of the invention herein, automatic regulation is effected by an electric power interconnection herewith. To this end, electric current supply lines 37, 38, are effective for operating motor 39 having shaft 40 (Figs. 10, 11) effective through speed reduction 41 for driving vertical shaft 42, carrying thereon disk 43 having projecting pin 44 coacting as a one toothed gear with toothed wheel 45 mounted on shaft 46 carried by brackets 47. This shaft 46, as an operator, has radially extending arm 48 terminally carrying insulation roller 49. In the rotation of the shaft 46, this roller 49 is effective for pushing contacts 30 outward into circuit closing relation with opposing terminals 31. There is thus an automatic selecting, in sequence of the different stations having the thermosensitive resistance 17.

Figures 4, 5, 6, 7, 8, 10:
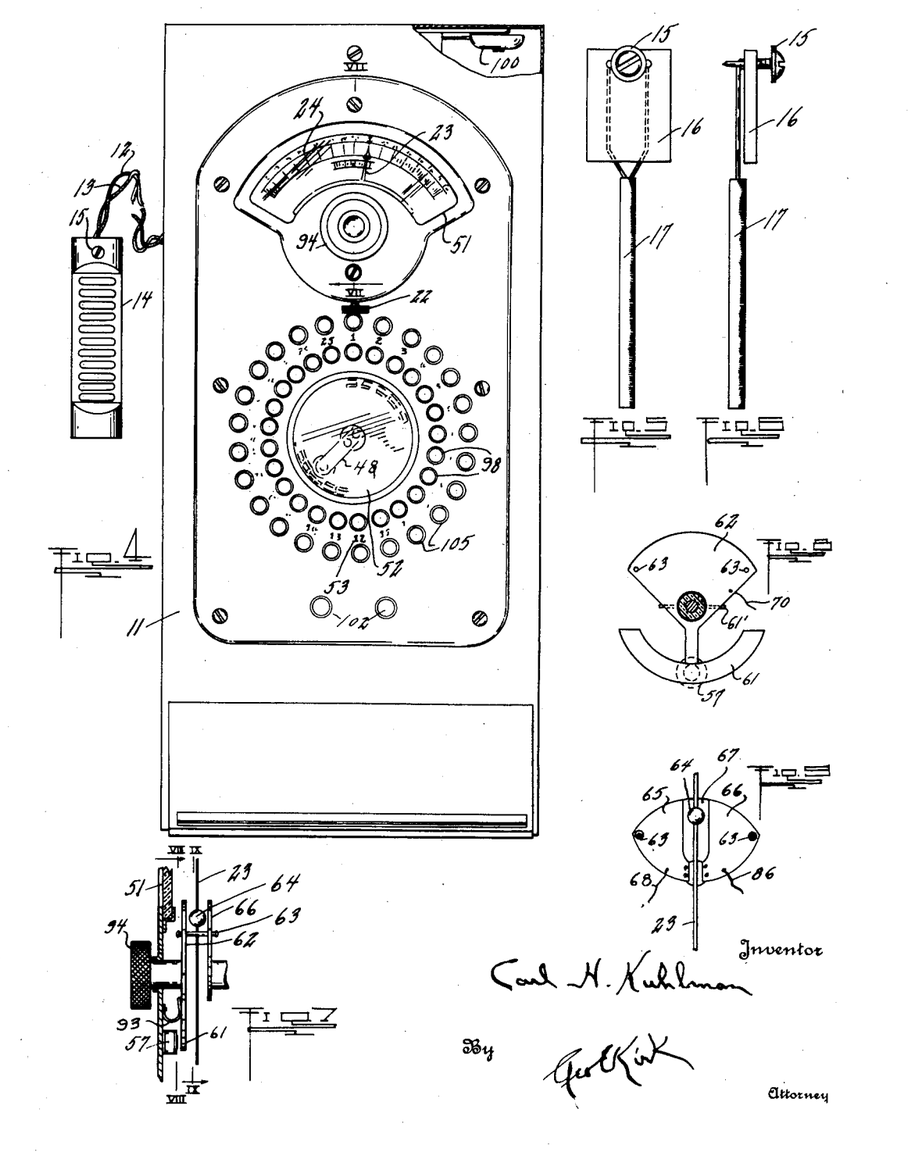
Fig. 4 is a front elevation, with parts broken away, of the central station for the telethermometer as shown in Fig. 1 in the heat regulator installation.
Fig. 5 is a view of a remote station device for the telethermometer with the housing removed.
Fig. 6 is a side elevation of the device of Fig. 5.
Fig. 7 is a partial section on the line VII—VII, Fig. 4.
Fig. 8 is a section on the line VIII—VIII, Fig. 7.
Fig. 10 is a plan view of the operator or actuator for the installation.
Figure 10:
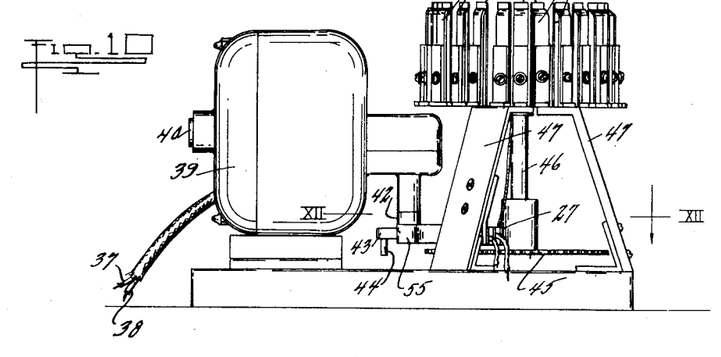
Figures 11, 12, 13:
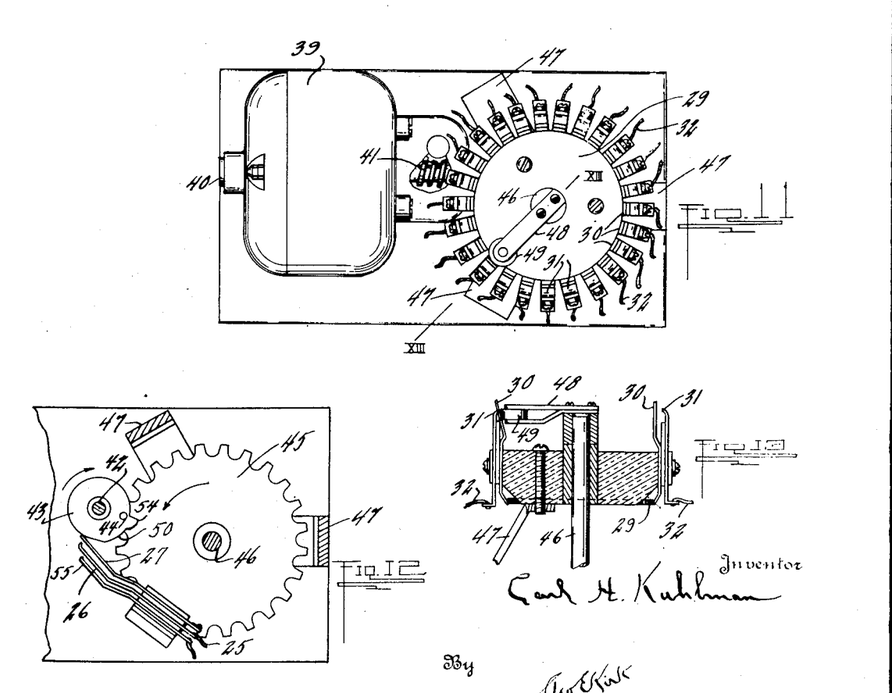
Fig. 11 is a side elevation of the actuator of Fig. 10.
Fig. 12 is a section on the line XII—XII, Fig. 10.
Fig. 13 is a section on the line XIII—XIII, Fig. 11.

These spring terminals 30 are shown as grouped about the bus bar 29 and may be in a desired number of stations as to which the telethermometer is to cooperate. The speed reduction at the gearing 41 as well as at the gearing 44, 45, constitutes an actuator which may be such to the motor 39 as to give a determined timing, say three minutes or other desired interval, for checking up the temperature condition at the different remote places 10.

The turning of the arm 48 with its roller 49 to effect contact between contact 30 and the terminal 31 is the selector for the circuit, but it does not complete the circuit for obtaining a reading at the galvanometer 18. The disk 43 on the shaft 42 has cam portion 50 coacting in its clockwise rotation with spring terminal 27 to thrust such against spring terminal 26, thereby closing the circuit from the galvanometer by way of the line 25 to the terminal 26, thence effective through the terminal 27 to the bus bar 29. The circuit thus closed causes the galvanometer needle 23 to shift as to the scale 24, herein shown as disclosing temperature degrees at window 51 (Fig. 4) in central station 11. The particular station having the reading may be observed through window 52 in central station 11, which window 52 discloses arm 48 and roller 49 and their location at the particular pair of terminals 30, 31, which are closed. Notation 53 radially from this arm 48 permits ready checking up for the automatically read particular remote station telethermometer. These readings may occur in sequence and at predetermined time intervals.

Hereunder the device of this installation is effective additionally for temperature regulation as well as reading and there is now described the regulator. To this end, the disk 43 has, in addition to the cam portion 50, a second cam portion 54 (Figs. 12, 14) which, as coacting with the spring terminals 27, 26, is effective for closing circuit between the spring terminal 26 and spring terminal 55, having therefrom line 56 to solenoid 57, thence by line 58 past transformer coil 59 as energized by the current from the lines 37, 38, to line 60 connected with the terminal 26. This energizing of the solenoid 57 is effective through armature 61 for shifting or flexing on bearing 61' conductor plate 62 (Figs. 7, 8, 14) as guided by insulation pins 63 into abutting relation with conductor ball 64 carried by the galvanometer needle 23. This action of striking the shiftable conductor 64 by the plate 12 flexes the needle 23, as normally out of contact with conductor plate 62 as well as opposing conductor plate sections 65, 66, so that this conductor 64 is effective as a switch in closing circuit between the plate 62 and opposing plate sections 65, or 66.

These plate sections 65, 66, have intermediate insulation section 67 so that there is a uniform clearance region from the plate 62. From the plate 65 extends line 68 to solenoid 69. In the event the position of the galvanometer needle 23 is such that the conductor 64 coacts between the plate 62 and the plate 65, there may be current supply by line 70 from the line 56 as energizing the solenoid 57 to flow through the conductor plate 62, the needle carried shiftable conductor 64, and the plate 65, through line 68 and solenoid 69, thence by line 71 to the line 58. The circuit as thus completed is effective to energize the solenoid 69 and close switch 72 for permitting flow of electric current from transformer coil 73 as energized by current flow from the lines 37, 38, to flow by line 74 past this switch 72 by line 75 past the panel 34 and solenoid 76 to line 77 past limit switch 78, thence by line 79 to controller or motor 80 (Figs. 1, 2, 3, 14); circuit from which motor 80 is completed by line 81, switch 81', coil 17' to lines 13, 36, 36' extending to the transformer secondary. The energizing circuit for this coil 17' is primarily effective to operate the switch 81' as the resistance 17 is cut in at the central station. This cutting in by the switch 81' by-passes the resistance 17 but allows the current from the line 81 to flow through this coil 17' and thence by line 13 in holding this circuit for the motor 80 closed. This switch 81' is closed when coil 17' in series with the thermo-responsive resistance 17 is energized. This resistance 17 is cut in for the central station reading. This operation of closing the switch 81' avoids detrimental effect of operating current for the motor upon the element 17 for the switch 81' cuts in from the line 12 by line 12' to by-pass the element 17.

As this operation of the galvanometer of the telethermometer shows the positioning of the needle below the desired point for regulation, inasmuch as there is also contact at the plate 65, there is operation of the motor 80 for rotating the shaft 82 of this controller in such direction that its threaded cooperation with sleeve 83 (Fig. 3) may shift the valve 3 toward closing position and the valve 4 as connected thereto by link 8 toward opening position so that the air supply through the duct 7 may be of greater heat capacity.

This operation of the controller is of slight interval in duration due to the fact that the arm 48 continues to move, and as so moving breaks circuit 79 or 92 to the motor 80, after two or three rotations of the shaft 82, as may be predetermined. This means that the telescopic operation between the shaft 82 and the nut sleeve 83 has worked a slight pull action upon bracket 84 to which the sleeve 83 is pivoted. This bracket 84 is fixed with the valve 3, and in the instance described, means a thrusting of the sleeve 83 away from the shaft 82, and accordingly a swinging of this valve 3 toward closing position and simultaneously swinging of the valve 4 toward a fractional opening position from whatever may have been the previous position as permitted by the pivotal mounting 80' for the motor 80.

In practice, the fractional operation may be even three or four steps between fully closed and fully opened. As the limit position is reached, lug 85 on the sleeve 83 strikes switch 78 to cause such to open, thereby precluding further operation of the valve in the heat control duct insofar as controller motor 80 may be effective. As the temperature is built up at the remote place and galvanometer 18 in the time interval takings of these temperatures has its needle 23 so positioned that shiftable conductor 64 is effective between the plate 62 and the plate 66, then there may be a re-operation of the motor 80 in the reverse direction, for this plate 66 is in communication by line 86, solenoid 87, with the line 71 for closing switch 87' in completing circuit from the line 74 by way of line 88 past the panel 34 and solenoid 89 to line 90, past switch 91 to be connected by line 92 with the motor 80; circuit from which is completed by the line 81. This connection to the motor 80 is for reverse operation to the connection by the line 79. Accordingly, the reverse direction of rotation of the shaft 82 of this motor 80 causes the sleeve 83 to move toward the motor 80, along the shaft 82 for opening the valve 3 for cold air and closing the valve 4 for warm air. This operation initially allows switch 78 to close, and is in steps similar to the closing operation and has discontinuance limit lug 85' effective for opening the switch 91.

As the temperature may reach the regulated position, say as determined by the insulation 67 between the plates 65, 66, a contact for closing the circuit by energizing the coil 57 causes the plate 62 to press the shiftable conductor 64 of the needle 23 against the insulation 67, and there is accordingly no circuit closing for operating the selected controller 80 for the corresponding remote place or station. Inasmuch as the cam 50, 54, is in continuous rotation, the time interval for the closing of the circuit for operating the motor at the controller 80 is brief. The operation of the motor 39 is continuous. This means that the arm 48 moves into position for preselecting, in sequence, a remote station. Thereafter or simultaneously, the cam 50 is in position for disclosing a telethermometer operation through the galvanometer 18 for bringing to the central station a report of the temperature condition at the selected remote place or station. Automatically, in sequence and during this temperature determining reading, cam 54 is effective for brief interval cutting in of the connections for a controller 80 if such connection may be made through either the plate 65 or the plate 66. If the regulation is at the desired point, the needle 23 of the galvanometer would place the shiftable conductor 64 in such position as to register with the insulation 67. This would mean no operation of a controller motor 80. As the cam 54 moves to allow the switch terminals 26, 55, to open, the solenoid 57 is de-energized and the plate 62 is shifted clear of the conductor 64 and the needle 23 assumes its normal position for clearance between these plates 62, 65, 66.

Spring 93 adjacent handle 94 (Fig. 7) assists in this recovery of the plate 62 for the initial clearance between the plates at this automatically operable two-way switch. By rotation of the handle 94, the plates 62, 65, 66, may be angularly shiftable as to the scale 24, thereby shifting the idle or insulation region 67 of the automatic device for each of the remote stations effecting simultaneously a change for the regulation region. For instance, the insulation region 67 may determine a regulation, say for day time control in a school building of 68° to 70°. For nights, Saturdays and holidays, it may be desirable to drop this reading to 48° or 50° F. To such end, this insulation region 67 could be shifted to the location of say 48° to 50° on the scale 24, and the automatic regulation for each of the stations is thus rendered effective for the changed temperature control.

In instances, it may be desirable under the automatic regulation to maintain a different temperature for some remote places as to others. For instance, a gymnasium station it may be desirable to carry at 55° or 60°, while a swimming pool station it may be desirable to carry at 75° F. These relatively independent adjustments may be made for a particular station by adjustment of the resistance 33 for such station.

There is provision in the disclosure herein for automatically indicating a plus or minus condition of the automatic control. To this end, from supply current lines 37, 38, there may be energized transformer coil 95 having line 96 therefrom coacting through solenoid switch 89 for line 97 with visible signal 98, thence by line 99 to audible signal 100, thence by line 101 to the other side of the transformer coil 95. Audible signal may be electric bell (Figs. 4, 14) located at the central station 11. Visible signal 98 may be colored light, as green light at central station 11 for disclosing a too high temperature. Switch 89 is shown as provided with a catch 102 holding such so that the attendant as returning to the station 11 may at a glance see which remote stations have been too warm and which too cool at the last effective operation of the controller for such station. The line 96 is shown as having branch 103 past switch 76 by way of line 104 to visible signal 105, say a red light, with line 106 therefrom to the line 99. Accordingly, it is seen that for each station with any signals of operations, catches 102 may hold in the switch for the visible signal and the audible signal 100 will operate until the attendant comes to the central station and releases the catches 102. If the absence of the attendant be for a period covering a plurality of controller operations, which may be in different directions as to a same remote station, the two signals would still be visible.

The source of electromotive force herein is exterior of the circuits and from the power lines 37, 38, which are herein shown to be alternating current for driving the motor 39. The electric circuit for operating the controller motor 80 is by power derived from the lines 37, 38, through the transformer 73. This motor 80 is not directly energized. Initially, it is necessary to have the regulator effective for cutting in the circuit for this motor 80. Accordingly, from the transformer 59, line 60 extends to terminal 26, which as acted upon by cam 54 closes circuit with terminal 55 connected by line 56 to solenoid 57, with the circuit therefrom completed to the transformer by the line 58. This energizing of the solenoid 57 is effective for positioning the plate 62 against the contact 64 and thrusting such into engagement with a plate 65 or 66. This involves an additional circuit, rendered effective by this switch 62, 64, 65 or 66.

Starting at the source of power or transformer 59, the circuit is thence by the line 60, terminals 26, 55, line 56, line 70, plate 62, needle carried contact 64, back plate 65, thence by line 68 to solenoid 69 and by line 71 to the line 58 extending back to this transformer as the energy source. The switch 72 at the solenoid is thus closed.

The energy source at the transformer 73 may have its current traced therefrom by line 74 to the switch 72, thence by line 75 past the panel 34, past coil 76, thence by line 77 past limit switch 78, line 79 to the motor 80. The circuit from this motor 80 is by line 81 to switch 81', thereby connected to the line 13, past the panel 34, thence by line 36, 36', to the transformer 73. The motor 80 is reversible and in the event the contact 64 carried by the needle 23 be shifted from the plate 65 to the plate 66, there would then be closing of the switch 87' and the circuit to the motor 80 would be from such switch 87' by line 88 past the panel 34 to solenoid 89 by line 90 past switch 91 and the line 92 to the motor 80.

The audible and visible alarms are effective by energy derived from the lines 37, 38, to transformer 95 by line 101 to audible alarm 100, thence by line 99, which in one direction is in series with visible alarm 98 as a light from which extends line 97 to switch closed by solenoid 89 and thence by line 96 back to the transformer 95. This is a signal operated when the motor 80 is energized by the line 92. If the motor 80 be energized by the line 79, the light 105 is effective with the circuit from the line 99 by way of the line 106, line 104, past the switch solenoid 76, thence by line 103 to the line 96.

The Wheatstone bridge energy is supplied by battery 20. The circuit therefrom away from the bridge is by line 25 to contact 26 effected by cam 50 to close circuit with contact 27, thence connected by line 28 to line 35 extending back to the Wheatstone bridge. From this line 28 there is connection to conductor ring 29 carrying contacts 30, whereby roller 49 in bringing a contact 30 against terminal 31 is effective through line 32, resistance 33 at the panel 34 for connecting in line 12 to a remote thermo-sensitive resistance 17. From thence there may be current flow past the coil 17' by line 13, thence past panel 34 by line 36 back to the Wheatstone bridge.

In the instance disclosed, a hot air control is shown with air valves therein instead of steam or water valves or gas control for gas heaters. The installation is one wherein controls for sources of heat supply as to various stations in conjunction with the telethermometer, may have telethermometer affected control for such stations, with the telethermometer as the regulator for the temperature control operation.

The telethermometer set up as herein involves, for accurate response in the two to four degrees variation under which effective control is had herein, a delicacy in response to electric current variations, say as accorded by the variations in the resistances 17. In practice, with these features of control, say in the furnace room of a school building or other institution, importance arises that the contacts as made in the selective series be definitely effected in a manner reliable under the operative conditions. The definite pushing in of the contacts by the arm 48 is practically effective to this end under range of operating conditions, even with the Wheatstone bridge response being as low as a fraction of an ohm. A material step against untoward departure from these control factors has been worked out as positively effective in the selection of the control or indicating circuits, even for a remote state responding with more than one control. This may mean, in application, say different points in a kiln or different responses for adjacent points.

Figure 16:
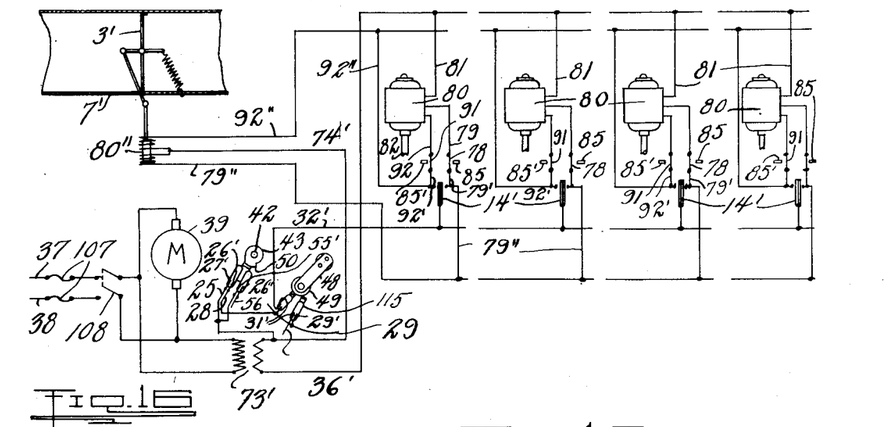
Fig. 16 is a wiring diagram of the installation hereunder having sub-remote stations in a remote station group, instead of unitary remote stations, and in this instance the sub-remote stations are selected as a unit but individually controlled.
Figures 17, 18:
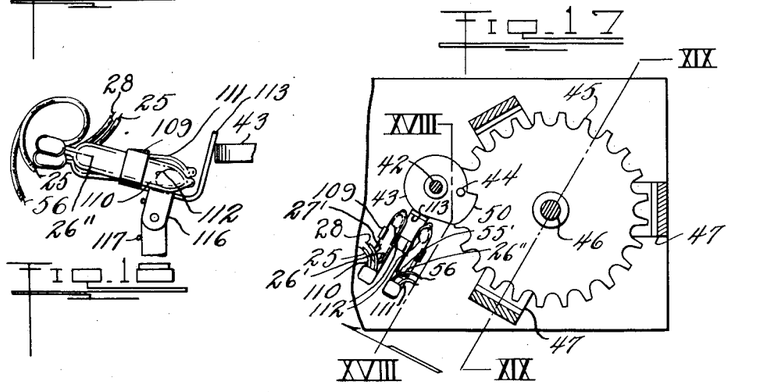
Fig. 17 is a view similar to Fig. 12, with a switch adaptable for reception response under slight voltage changes.
Fig. 18 is a section on the line XVIII—XVIII, Fig. 17.
Figure 19:
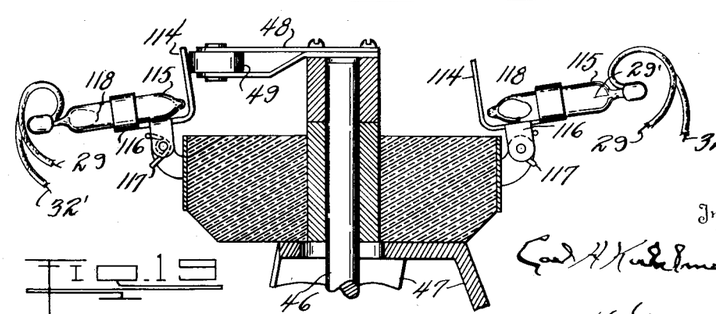
Fig. 19 is a section on the line XIX—XIX, Fig. 17.

In such set-up, the power current lines 37, 38, (Fig. 16) as passing fuses 107 may be cut in by manually thrown switch 108 to operate the continuously running motor 39 as determining the selection and control for action at a station of a system or installation. This, accordingly, may be a common actuating source as to the lines 37, 38 (Fig. 14); and with a similar type of time interval means in the motor 39 continuously running (Fig. 14), there is the added feature of the fuses 107 and manually controlled switch (Fig. 16). The cam device 43 herein, instead of pushing for closing switches 27, 26, 55 (Fig. 14), may rock bracket 109 (Fig. 18) carrying insulation or glass tubes 110, 111, say with mercury charge 112 in each thereof, so that as arm 113 is contacted to effect this tilting of the bracket 109 the mercury 112 will roll back, first in the tube 111 to close terminals 26', 27', and in sequence thereafter the mercury in the tube 110 will close terminals 26", 55'. This operation of the disk 43 (whether in the wiring diagram Fig. 14, or that of Fig. 16, or such combined) follows or is subsequent to the action of the arm 48 and its roller 49 in striking selector arm 114 (Fig. 19), thereby rocking tube 115 on its bracket 116 against resistance of spring 117. The selector arm 114 is timed to act and be operated by the roller 49 in the manner that the contact 30 (Fig. 14) is tilted. This causes mercury 118 in the tube 115 to get to the remote end of this device and there connect terminal 29' with terminal 31' in connecting for the selected remote circuit for line 32' to connect to temperature resistance or thermo-responsive device 14', herein shown as in parallel as substations at a single remote station, which circuit may be completed thereby one way by line 79' and the other way therefrom by line 92' in series with lines 79 and 92 directly to the motor 80. The third line 81 to this motor 80 is by way of line 36' connected to transformer 73' as affording direct control for this motor 80 as for this specific sub-station region, while in parallel therefrom the lines 79, 92, 74', extend to device or solenoid 80", which may operate secondary damper device 3' in secondary duct 7', control of which may be effected from primary duct 7 and its primary damper 3 as shifted by the motor 80, for the sequence of temperature control for "off" position as the several sub-stations are out, but for "on" position as any one of the several stations may be in. This of course may be, say for a warming operation in the winter season or a cooling operation in the summer season. The mercury switches (Figs. 16-19 inc.) are such in the wiring set up herein as may be adopted in view of the terminals 27, 26, 55, 30, 31 (Fig. 14), directly in such wiring control, supplemental thereto, or in simplified grouping (Fig. 16).

The equipment herein is adaptable to wide ranges of installation in the responsive disclosure for attention and in giving attention to different points, whether in bins, say of grain which may require temperature control information at five foot intervals in a twenty foot diameter bin of sixty feet in height in a group of fifty or sixty of such bins as together, say in concrete cylinder form with the bins not only in the cylinders but in the spaces therebetween. Likewise, there is use in connection with kilns as to a plurality thereof or as to locations in the kilns. Furthermore, such may be used in connection with institutions or buildings having a plurality of rooms, or even as to locations in a room.

In the instance of places of public entertainment such as theaters, there is the condition not only on the stage, in the dressing rooms, in the orchestra, but in the galleries, in the balcony, and in the lobby. These may require different temperature conditions, and the various instruments 14 of Fig. 1 to cut in or out or instrument 14' (Fig. 16) to cut in for one direction or in the other direction of control or be inactive as neutral. In this adaptation of the two-way throw instead of the single resistance control 14 (Fig. 1), this thermostat scheme 14' (Fig. 16) is effective to close the circuit for effecting operation of the control means 80 in one direction at one flexing of the thermostat 14', inactive at the mid-position, and the other direction at the reverse flexing of this thermo-sensitive device 14'. This means that the motor 80 may operate a temperature control device as damper (Figs. 2, 3), effective to allow for temperature change effecting condition as air current flow for a higher temperature air supply, no change in temperature air supply, cut off of air supply, or low temperature of air supply. The functioning may be general for a series of locations in a building or plant, wherein there may be common condition arising for temperature control, or different conditions arising say in the plant where there may be different operations requiring different degrees of heat. For instance, in candy manufacture there may be desired a low condition to effect congealing, or in painting a high condition for fluidity as in spray painting, and even to handle the work in or through the kiln whether such be for stationary use or progressing the work therethrough as lehr type.

In these instances for differences of control, the motor 80 may be from a distinctive source with the indicating instrument or thermo-sensitive response to the condition for such location, whether it be a cold storage plant region requiring temperature of 10° F., 20° F., 35° F.; in plant labor operations, say 60° F.; or in candy manufacture, say 80° F. and for painting; or higher temperature conditions as for kilns. In the further instance, these may be joined up as air conditioning control for labor incidental to plant operations even to operating kilns.

In the instance that it may be desired to control conditions of various locations in a kiln, the set-up may be the major distinctive controls as shown in general wiring diagram (Fig. 14), whether the remote station be the resistance 17 or the switch throw thermo-responsive device 14'. In either event, there is effected the idle or step control for the motor 80 and in either direction therefor. In this step control, the time interval factor as recurring briefly, through the operation of the motor 39 and the speed reduction, means that the damper or control means may be operated for a slight angle of throw and such may be located as sufficient to hold a condition, with the subsequent operation as effected from the arm 48 failing to result in any further operation of the motor 80. This thereby leaves the control therefrom as the damper in such set position. At once there is a fluctuation therefrom requiring control for higher or lower temperature, the thermo-responsive means is effective to initiate such at the time recurring brief interval.

In the groupings, say for different locations in a kiln room or tunnel, there may not be occasion for an opposite condition, that is, the supply line may be either for chilling air in the event of refrigeration, or warming air in the event of kiln operation. This would mean that the general condition throughout the various places in the kiln may respond to a primary control as by reversely acting solenoid 80'' (Fig. 16). Such general duct may be provided with branch ducts therefrom, say to registers 9 (Fig. 1) with the motor 80 (Fig. 16) effective to actuate the supplemental damper for such registers 9 in leaving the damper at the degree of opening in the event the temperature conditions be satisfied. In the event there be not the desired condition, the motor 80 may act to cure such by stepping to open the damper further in the event it be desired to increase the warm air as in a kiln or to cut the damper toward closed position in the event the temperature be too high.

In this installation of primary central station control for remote stations (Fig. 14), the switches as operated by arm 48 may be of the type 30, 31, or the type of mercury switch (Fig. 18) throughout. Likewise, as to the thermo-responsive instrument, such may be of the resistance type (Fig. 5) or the switch-throwing thermostat 14' (Fig. 16). Accordingly, the set-up may be with a main central station (Figs. 14 or 16), or main central station (Fig. 14) and subordinate stations therefrom (Fig. 16).

This application is a continuation in part of this applicant's application Serial No. 231,624, filed November 7, 1927, for Temperature regulation.

What is claimed and it is desired to secure by Letters Patent is:

1. A transmitting system comprising a central station, remote stations including condition-change-responsive means, and control-affecting means for the respective stations including a switch, electric circuit connections between the respective stations and the central station for the responsive and control-affecting means, said central station including a selector for the remote stations, an electrical device adapted to be placed in series with said selector and the circuit connections from the device to the respective remote stations through the responsive means to affect device operation, and additional electrical connection at said respective station switches to said control-affecting means and therefrom completed by said device operation for placing said control-affecting means in parallel with said device to avoid disturbance of control-affecting means operation, and an actuator at the central station interconnecting said device, control-affecting means, and condition-change-responsive means for selector control operation.

2. In a temperature control system, a central station, remote stations including temperature change-responsive means and temperature control-affecting means movable relatively to the change-responsive means for the respective stations, electric circuit connections between the respective stations and the central station, said central station including a plurality of complete switch means, a continuously running motor intermittently actuating said switches, and, in addition to said control-affecting means and for each remote station, switch means controlled through said connections from the central station in response to conditions at said respective remote stations, said electric connections at the respective remote stations including direct electric connection from such station's temperature responsive means to its control-affecting means, said motor at the central station interconnecting said switch means and responsive means for selective control operation.

3. In a temperature control system, a central station, remote stations including temperature change-responsive means and temperature control-affecting means, electric circuit connections for said means between the respective stations and the central station, said central station including a selector for the remote station change-responsive means, said selector embodying an annular series of complete independent switches each normally in switch open position and operable to be closed by said selector, a device adapted to be cut in by the selector switch, an additional switch spaced from the selector operated switch, and an actuator for the selector effective through said additional switch for thereby placing a selected remote station change-responsive means and control-affecting means in series with the device.

4. A transmitting system comprising a central station, remote stations, independent connections between the remote stations and the central station, a continuous running device at the central station and in said connections determining a time interval for the connection to be effective, a controller for each remote station, said device including selective individually-complete rockable switch means for the controller, an element movable with the device for actuating the switch means relatively to the device, and condition change-responsive means for the remote stations determining through said switch means controller operation in the time interval limited by the device.

5. A transmitting system comprising a central station, remote stations, independent connections between the remote stations and the central station, a continuous running device at the central station and in said connections determining a time interval for the connection to be effective, a reversible controller for each remote station, said device including selective individually-complete rockable switch means for the controller, an element movable with the device for actuating the switch means relatively to the device, and condition change-responsive means for the remote stations determining through said switch means controller direction for operation in the time interval limited by the device.

6. A transmitting system comprising a continuously rotating power drive having uniform angular velocity, a central station and a plurality of remote stations, a step-by-step mechanically-shifted operator at the central station including selecting individually-complete rockable switch means for the remote stations power driven by said operator, in addition to said selecting means intermittently operable connecting means movable relatively to said selecting means, said connecting means successively cutting-in said selected remote stations with the central station through a selecting means and a connecting means and effective therefrom and through the operator response to condition change at said remote stations, said connecting means and operator each including an element in angular synchronism with and actuated from the drive, and control means provided with power devices having their positioning effected from the central station by said changes.

7. A transmitting system comprising a central station, a plurality of remote stations, power driven direct-contact-face-action selector switch means at the central station for the remote stations in sequence, a controller, and an actuator embodying in addition to said selector means intermittently operable connecting means movable relatively to said selector means, said connecting means cutting-in a selector means and a connecting direct-contact-face-action switch means in series from a remote station with the central station in the selected sequence effective at the central station for determining controller operation in response to said condition changes.

8. A transmitting system embodying a continuously rotating power drive having uniform angular velocity, a central station, remote stations, a single power driven step-by-step shiftable remote-station-selecting arm, a controller, an intermittently connectible uniformly-resistanceless actuator switch including an electric circuit for the respective stations embodying an additional connection than through said arm, and in addition to said selected switches, intermittently operable uniformly-resistanceless switch means in series therewith from a remote station with said arm actuated connection for cutting-in the selected remote stations thereby effective at the central station for coacting in response at the central station to a condition change at a remote station, said intermittently operable means being movable relatively to the selecting arm, said means including an element movable with the arm each in angular synchronism with and actuated by the drive.

9. A transmitting system embodying a continuously rotating power drive having uniform angular velocity, a central station, remote stations, a single power driven step-by-step shiftable arm, a controller, an intermittently connectible actuator resistanceless switch for placing said central station in operative relation with a remote station embodying an additional connection than through said arm, including electric circuit means for the stations, and (in addition to said selecting arm) intermittently operable rockable resistanceless switch means in series with said arm actuated connection for cutting-in from said arm and an additional connection with a selected remote station responsive to its condition change and determining controller operation in response thereto, said intermittently operable switch means being movable relatively to the step-by-step shiftable arm, said means including an element movable with the arm each in angular synchronism with and actuated by the drive.

10. A transmitting system embodying a continuously rotating power drive having uniform angular velocity, a central station, a remote station, a single power driven step-by-step shiftable arm, a two-way switch movable relatively to and closable from said arm embodying an additional connection than through said arm, a reversible controller in series with said switch, a circuit between the remote station and the central station, and an intermittently operable uniformly-stable switch in series with said arm actuated connection effective in determining responsive operation of the controller for the remote station for disclosing condition change at such remote station, said intermittently operable switch including an element movable with the arm each in angular synchronism with and actuated by the drive.

11. A transmitting system embodying a continuously rotating power drive having uniform angular velocity, a central station, remote stations, a single power driven step-by-step shiftable arm at the central station, circuits therefor, a circuit terminal uniformly-stable switch for each station to be engaged by said arm, intermittently operable switch means in series with said arm switch for thereafter cutting-in current for in-advance selected remote station, a two-way switch movable relatively to and closable through connections from said arm, reversible controllers, and an additional circuit between the remote stations and the central station common to said switch for the different controllers for operating said controllers in response to disclosing condition change of a selected remote station, said intermittently operable switch including an element movable with the arm each in angular synchronism with and actuated by the drive.

12. A transmitting system embodying a continuously rotating power drive having uniform angular velocity, a central station, remote stations, a single power driven step-by-step shiftable arm at the central station, a station selecting uniformly-stable switch actuable by the arm, intermittently operable independent uniformly-stable switch means in series with said arm for the selected remote station, a two-way switch movable relatively to and intermittently closable through said arm embodying an additional connection than through said arm, a reversible controller, and a circuit between the central station and the remote station affected by said switch intermittent closings and provided with connections for effecting fractional operation of the controller by intermittently connecting said remote station to the central station, and controlling means operable in response to disclosure of condition change of the selected remote station, said intermittently operable means including an element movable with the arm each in angular synchronism with and actuated by the drive.

13. A transmitting system comprising a continuously rotating electric motor, an annular series of uniformly-stable independent switches, a relatively movable closer for said switches in succession, additional uniformly-stable switch means connected in series therefrom to be actuated from said motor including an intermittent drive for said closer also actuable from said electric motor, and circuits for the several switches, said additional switch means providing an intermittent connector actuable by the motor in synchronism with the closer and in series with a connected switch of said series for energizing said respective circuits in sequence.

14. A transmitting system comprising a continuously rotating electric motor, an annular series of uniformly-stable switches, a relatively movable closer for said switches in succession, additional uniformly-stable switch means in series therefrom to be actuated from said motor including an intermittent drive for said closer also actuable from said electric motor, circuits for the several switches, and independent resistances in said circuits responsive to temperature conditions to be checked by the system, said additional switch means providing an intermittent connector actuable by the motor in synchronism with the closer and in series with a connected switch of said series for energizing said respective circuits for current flow response to conditions as affecting the resistances.

15. A transmitting system comprising a continuously rotating electric motor, an annular series of uniformly-stable switches, a relatively movable closer for said switches in succession, additional uniformly-stable switch means connected in series therefrom to be actuated from said motor including an intermittent drive for said closer also actuable from said electric motor, circuits for the several switches, independent resistances in said circuits responsive to temperature conditions to be checked by the system, said additional switch means providing an intermittent connector actuable by the motor in synchronism with the closer and in series with a connected switch of said series for energizing said respective circuits, controller switch means to be actuated in response to conditions as affecting the resistances, and a reversible motor operable from said controller switch means.

16. A transmitting system comprising a continuously operating electric motor, an annular series of tiltable switches, respective circuits for the series of switches, tiltable switch means determining a time interval for the successive connection of the switches, controller means for each of said circuits in addition to said switch means, actuating means for the switch means and controller means in effecting movement thereof relatively to the motor, and condition-change-responsive means for the respective circuits determining through the controller means direction for operation in the time interval limited by the motor.

CARL H. KUHLMAN.